United States Patent
Chen et al.

(10) Patent No.: US 7,240,086 B2
(45) Date of Patent: Jul. 3, 2007

(54) METHOD OF IMAGE FORMAT CONVERSION AND REMOTE CONTROL DEVICE USING THE SAME

(75) Inventors: Chi-Min Chen, Erlin Township, Changhua County (TW); Chih-Ming Tsai, Wugu Township, Taipei County (TW)

(73) Assignee: Aten International Co., Ltd., Taipei (TW)

( * ) Notice: Subject to any disclaimer, the term of this patent is extended or adjusted under 35 U.S.C. 154(b) by 246 days.

(21) Appl. No.: 10/996,661

(22) Filed: Nov. 23, 2004

(65) Prior Publication Data
US 2005/0140995 A1    Jun. 30, 2005

(30) Foreign Application Priority Data
Dec. 26, 2003    (TW) .............................. 92137042 A (51) Int. Cl.
*G06F 7/52* (2006.01)
(52) U.S. Cl. ....................................... 708/627; 345/603

(58) Field of Classification Search ................. 708/627
See application file for complete search history.

(56) References Cited

U.S. PATENT DOCUMENTS

| | | | | |
|---|---|---|---|---|
| 6,065,033 A | * | 5/2000 | Jouppi ......................... | 708/670 |
| 6,434,586 B1 | * | 8/2002 | Carlson et al. ............. | 708/625 |
| 6,728,744 B2 | * | 4/2004 | Amer ......................... | 708/625 |

* cited by examiner

*Primary Examiner*—Mark Zimmerman
*Assistant Examiner*—Kevin Xu
(74) *Attorney, Agent, or Firm*—Thomas, Kayden, Horstemeyer & Risley (57) ABSTRACT

A method of image format conversion and remote control device using the same. Addition terms for a first layer are derived from an image conversion table. Every two addition terms are assigned to an addition group, obtaining a plurality of addition groups. The two addition terms of each addition group are added by using an adder to obtain addition terms for next layer thereafter. The bit number of the adder is equivalent to that of one addition term comprising the maximum bit number in every addition group. Finally, the addition process is repeated to obtain the operation result.

6 Claims, 15 Drawing Sheets

| BIT19 | BIT18 | BIT17 | BIT16 | BIT15 | BIT14 | BIT13 | BIT12 | BIT11 | BIT10 |
|---|---|---|---|---|---|---|---|---|---|
| | | | | | | | | 0 | 1 |
| | | | | | | | | R7 | R6 |
| | | | | | | | R7 | 0 | 0 |
| | | | | | | 0 | 0 | 0 | 0 |
| | | | | | 0 | 0 | 0 | 0 | 0 |
| | | | | 0 | 0 | 0 | 0 | 0 | 0 |
| | | | 0 | 0 | 0 | 0 | 0 | 0 | 0 |
| | | 0 | R6 | R5 | R4 | R3 | R2 | R1 | R0 |
| R7 | | | | | | | | | |

| BIT9 | BIT8 | BIT7 | BIT6 | BIT5 | BIT4 | BIT3 | BIT2 | BIT1 | BIT0 |
|---|---|---|---|---|---|---|---|---|---|
| 0 | 0 | R7 | R6 | R5 | R4 | R3 | R2 | R1 | R0 |
| 0 | 0 | 0 | 0 | 0 | 1 | 1 | 1 | 0 | 0 |
| 0 | R6 | R5 | R4 | R3 | R2 | R1 | R0 | 0 | 0 |
| R7 | R6 | R5 | R4 | R3 | R2 | R1 | R0 | 0 | 0 |
| R7 | R5 | R4 | R3 | R2 | R1 | R0 | | | |
| R6 | R4 | R3 | R2 | R1 | R0 | | | | |
| R5 | R3 | R2 | R1 | R0 | | | | | |
| 0 | 0 | 0 | 0 | 0 | | | | | |
| 0 | 0 | 0 | 0 | | | | | | |
| 0 | 0 | 0 | | | | | | | |
| 0 | 0 | | | | | | | | |
| 0 | | | | | | | | | |

FIG. 1b

| BIT19 | BIT18 | BIT17 | BIT16 | BIT15 | BIT14 | BIT13 | BIT12 | BIT11 | BIT10 | BIT9 | BIT8 | BIT7 | BIT6 | BIT5 | BIT4 | BIT3 | BIT2 | BIT1 | BIT0 |
|---|---|---|---|---|---|---|---|---|---|---|---|---|---|---|---|---|---|---|---|
| | | | | | | | | | | | | R7 | R6 | R5 | R4 | R3 | R2 | R1 | R0 |
| | | | | | | | | | | | | | | | | | | | 0 |
| | | | | | | | | | | | | | | | | | | 1 | 0 |
| | | | | | | | | | | | R7 | R6 | R5 | R4 | R3 | R2 | R1 | R0 | |
| | | | | | | | | | | | | | | | | | 1 | 1 | 0 |
| | | | | | | | | | | R7 | R6 | R5 | R4 | R3 | R2 | R1 | R0 | | |
| | | | | | | | | | | | | | | | | 0 | 1 | 1 | 0 |
| | | | | | | | | | R7 | R6 | R5 | R4 | R3 | R2 | R1 | R0 | | | |
| | | | | | | | | | | | | | | | 0 | 0 | 1 | 1 | 0 |
| | | | | | | | | R7 | R6 | R5 | R4 | R3 | R2 | R1 | R0 | | | | |
| | | | | | | | | | | | | | | 0 | 0 | 0 | 1 | 1 | 0 |
| | | | | | | | R7 | R6 | R5 | R4 | R3 | R2 | R1 | R0 | | | | | |
| | | | | | | | | | | | | | 0 | 0 | 0 | 0 | 1 | 1 | 0 |
| | | | | | | R7 | R6 | R5 | R4 | R3 | R2 | R1 | R0 | | | | | | |
| | | | | | | | | | | | | 1 | 0 | 0 | 0 | 0 | 1 | 1 | 0 |
| | | | | | R7 | R6 | R5 | R4 | R3 | R2 | R1 | R0 | | | | | | | |
| | | | | | | | | | | | 0 | 1 | 0 | 0 | 0 | 0 | 1 | 1 | 0 |

FIG. 2

| BIT19 | BIT18 | BIT17 | BIT16 | BIT15 | BIT14 | BIT13 | BIT12 | BIT11 | BIT10 |
|-------|-------|-------|-------|-------|-------|-------|-------|-------|-------|
|       |       |       |       |       |       |       |       | 0     | 1     |
|       |       | R7    | R6    | R5    | R4    | R3    | R2    | R7    | R7    |
|       |       |       |       |       |       |       |       | R1    | R6    |
|       |       |       |       |       |       |       |       |       | R0    |

| BIT19 | BIT18 | BIT17 | BIT16 | BIT15 | BIT14 | BIT13 | BIT12 | BIT11 | BIT10 |
|-------|-------|-------|-------|-------|-------|-------|-------|-------|-------|
|       |       |       |       |       |       |       |       | 1     | 0     |
|       |       |       |       | G5    | G4    | G3    | G2    | G7    | G6    |
|       |       |       |       |       |       |       | G1    | G0    |       |

| BIT19 | BIT18 | BIT17 | BIT16 | BIT15 | BIT14 | BIT13 | BIT12 | BIT11 | BIT10 |
|-------|-------|-------|-------|-------|-------|-------|-------|-------|-------|
|       |       |       |       |       |       |       |       | 0     | 0     |
|       |       |       |       | B7    | B7    | B6    | B5    | B7    | B6    |
|       |       |       |       |       | B6    | B5    | B4    | B4    | B3    |
|       |       |       |       |       |       |       |       | B3    | B2    |

| BIT9 | BIT8 | BIT7 | BIT6 | BIT5 | BIT4 | BIT3 | BIT2 | BIT1 | BIT0 | |
|---|---|---|---|---|---|---|---|---|---|---|
| 0 | 0 | R7 | R6 | R5 | R4 | R3 | R2 | R1 | R0 | TERM2 |
| 0 | R6 | R5 | R4 | R3 | R2 | R1 | R0 | | | TERM3 |
| R5 | R4 | R3 | R2 | R1 | R0 | | | | | TERM4 |
| | | | | | | | | | | TERM9 |

| BIT9 | BIT8 | BIT7 | BIT6 | BIT5 | BIT4 | BIT3 | BIT2 | BIT1 | BIT0 | |
|---|---|---|---|---|---|---|---|---|---|---|
| 0 | 0 | G7 | G6 | G5 | G4 | G3 | G2 | G1 | G0 | TERM5 |
| G5 | G4 | G3 | G2 | G1 | G0 | | | | | TERM10 |

| BIT9 | BIT8 | BIT7 | BIT6 | BIT5 | BIT4 | BIT3 | BIT2 | BIT1 | BIT0 | |
|---|---|---|---|---|---|---|---|---|---|---|
| 0 | 1 | B7 | B6 | B5 | B4 | B3 | B2 | B1 | B0 | TERM1 |
| B5 | B4 | B3 | B2 | B1 | B0 | | | | | TERM6 |
| B2 | B1 | B0 | | | | | | | | TERM7 |
| B1 | B0 | | | | | | | | | TERM8 |

| BIT9 | BIT8 | BIT7 | BIT8 | BIT7 | BIT6 | BIT5 | BIT4 | BIT3 | BIT2 | BIT1 | BIT0 | |
|------|------|------|------|------|------|------|------|------|------|------|------|---|
|      |      |      | R7   | R6   | R5   | R4   | R3   | R2   | R1   | R0   | 0    | TERM2 |
| +    |      |      | 0    | 0    | R7   | R6   | R5   | R4   | R3   | R2   | R1   | R0   | TERM1 |
|      |      |      |      |      |      |      |      |      |      |      |      | TERM11 |
|      |      | 0    | R7   | R6   | R5   | R4   | R3   | R2   | R1   | R0   | 0    | TERM3 |
| +    | R7   | R6   | R5   | R4   | R3   | R2   | R1   | R0   | 0    |      |      | TERM4 |
|      |      |      |      |      |      |      |      |      |      |      |      | TERM12 |

FIG. 4

| | | |
|---|---|---|
| TERM1 + TERM2 | = TERM11 | ⎫ |
| TERM3 + TERM4 | = TERM12 | ⎬ LAYER0 |
| TERM5 + TERM6 | = TERM13 | ⎬ |
| TERM7 + TERM8 | = TERM14 | ⎭ |
| TERM9 + TERM10 | = TERM15 | |
| TERM11 + TERM12 | = TERM16 | ⎫ |
| TERM13 + TERM14 | = TERM17 | ⎬ LAYER1 |
| TERM15 + 16 | = TERM18 | ⎭ |
| TERM16 + TERM17 | = TERM19 | LAYER2 |
| TERM18 + TERM19 | = Result(Y) | LAYER3 |

| BIT19 | BIT18 | BIT17 | BIT16 | BIT15 | BIT14 | BIT13 | BIT12 | BIT11 | BIT10 | BIT9 |
|---|---|---|---|---|---|---|---|---|---|---|
| | | | | | | | B4 | B3 | B2 | B1 |
| | | | | B7 | B6 | B5 | B3 | B2 | B1 | B0 |
| | | | B7 | B6 | B5 | B4 | B2 | B1 | B0 | |
| | | B7 | B6 | B5 | B4 | B3 | | | | |
| | | a0 | a8 | a7 | a6 | a5 | a4 | a3 | a2 | a1 |
| | | b7 | b6 | b5 | b4 | b3 | b2 | b1 | b0 | |
| | b10 | b9 | b8 | b7 | b6 | b5 | b4 | b3 | a9 b2 | a8 b1 |
| c18 | c17 | c16 | c15 | c14 | c13 | c12 | c11 | c10 | c9 | c8 |

| FIG. 7a | FIG. 7b |

FIG. 7b

| | BIT18 | BIT17 | BIT16 | BIT15 | BIT14 | BIT13 | BIT12 | BIT11 | BIT10 | BIT9 |
|---|---|---|---|---|---|---|---|---|---|---|
| | | | | | | | | | | R7 |
| | | | | | | | | | R7 | G7/R6 |
| | | | | | | | | R7/G6 | R6/G5 | R5/G4 |
| | | | | | | | G7 | R5/G4 | R4/G3 | R3/G2 |
| | | | | | | R7/G6 | R6/G5 | R2/G1 | R1/G0 | R0 |
| | | | | | G7 | R4/G3 | R3/G2 | | | |
| | | | | R6/G5 | R5/G4 | | | | | |
| | | | R7/G6 | | | | b9 | a9/b8 | b9 | a9/b8 |
| | | G7 | | b9 | a9/b8 | a8/b7 | a7/b6 | a6/b5 | a8/b7 | a7/b6 |
| | | | b0 | b9 | | b11 | b10 | | a5/b4 | a4/b3 |
| | | b11 | | | | | | a11/b9 | a10/b8 | a9/b7 |
| | b12 | | | | a14/b8 | a13/b7 | a12/b6 | a11/b5 | a10/b4 | a9/b3 |
| | c18 | c17 | c16 | c15 | c14 | c13 | c12 | c11 | c10 | c9 |

| | BIT0 | BIT1 | BIT2 | BIT3 | BIT4 | BIT5 | BIT6 | BIT7 | BIT8 | |
|---|---|---|---|---|---|---|---|---|---|---|
| TERM1 | G0 | G1 | G2 | G3 | G4 | G5 | G6 | G7 | | → TERM13 |
| TERM2 | | R0 | R1 | R2 | R3 | R4 | R5 | R6 | R7 | → TERM14 |
| TERM3 | | | G0 | G1 | G2 | G3 | G4 | G5 | G6 | → TERM15 |
| TERM4 | | | | R0 | R1 | R2 | R3 | R4 | R5 | → TERM16 |
| TERM5 | | | | | | G0 | G1 | G2 | G3 | → TERM17 |
| TERM6 | | | | | R0 | R1 | R2 | R3 | R4 | → TERM18 |
| TERM7 | | | | | | | R0 | R1 | R2 | → TERM19 |
| TERM8 | | | | | | | | G0 | G1 | → TERM20 |
| TERM9 | a0 | a1/b0 | a2/b1 | a3/b2 | a4/b3 | a5/b4 | a6/b5 | a7/b6 | a8/b7 | → TERM21 |
| TERM10 | | | a0 | a1/b0 | a2/b1 | a3/b2 | a4/b3 | a5/b4 | a6/b5 | → TERM22 |
| TERM11 | a0 | a1 | a2/b0 | a3/b1 | a4/b2 | a5/b3 | a6/b4 | a7/b5 | a8/b6 | → TERM23 |
| TERM12 | a0 | a1 | a2 | a3 | a4 | a5 | a6/b0 | a7/b1 | a8/b2 | |
| | c0 | c1 | c2 | c3 | c4 | c5 | c6 | c7 | c8 | |

| BIT19 | BIT18 | BIT17 | BIT16 | BIT15 | BIT14 | BIT13 | BIT12 | BIT11 | BIT10 |
|---|---|---|---|---|---|---|---|---|---|
| | ~a18 | ~a17 | ~a16 | ~a15 | ~a14 | ~a13 | ~a12 | ~a11 | ~a10 |
| | b18 | b17 | b16 | b15 | b14 | b13 | b12 | b11 | b10 | b9 |
| c19 | c18 | c17 | c16 | c15 | c14 | c13 | c12 | c11 | c10 |

| | BIT9 | BIT8 | BIT7 | BIT6 | BIT5 | BIT4 | BIT3 | BIT2 | BIT1 | BIT0 | |
|---|---|---|---|---|---|---|---|---|---|---|---|
| | ~a9 | ~a8 | ~a7 | ~a6 | ~a5 | ~a4 | ~a3 | ~a2 | ~a1 | ~a0 | TERM 23 |
| | b8 | b7 | b6 | b5 | b4 | b3 | b2 | b1 | b0 | 1 | TERM 9 |
| c9 | c8 | c7 | c6 | c5 | c4 | c3 | c2 | c1 | c0 | RESULE (Cb) |

FIG. 11 ately operated. The decimal coefficients of terms are converted to binary positives, for example, decimal coefficients
METHOD OF IMAGE FORMAT CONVERSION AND REMOTE CONTROL DEVICE USING THE SAME

BACKGROUND

The present invention relates to data conversion, and in particular to a method of image format conversion and remote control device using the same.

Keyboard/Video/Mouse (KVM) management systems access remote data via the Internet, referring to KVM Access over IP, which retrieves video frames from remote computer devices for monitoring. Video frames must be pre-processed to enhance data communication, and one way to achieve such purpose is to convert RGB images to YCbCr images, an image conversion simultaneous equation thereof described in the following:

$$Y=(0.275*R)+(0.504*G)+(0.098*B)+16 \quad (1),$$

$$Cb=-(0.148*R)-(0.291*G)+(0.439*B)+128 \quad (2),$$

$$Cr=(0.439*R)-(0.368*G)-(0.071*B)+128 \quad (3).$$

Equations (1)~(3) include multiplication and addition operations, conventionally implemented by using adders and multiplexers in circuit manufacture, thus resulting in excessive chip volume and operation time.

SUMMARY

Accordingly, an object of the invention is to provide a remote control device for image format conversion, converting RGB images to YCbCr images.

Another object of the invention is to provide a method for image format conversion, substantially reducing chip volume.

According to the object described, embodiments of the invention provide a method of image format conversion. First, an RGB image is analyzed for generating an image conversion table comprising a plurality of addition terms. An addition process is applied to the addition terms to obtain color values corresponding to an YCbCr image. The addition process further comprises the steps of obtaining the addition terms for a first layer from the image conversion table, allocating every two addition terms to an addition group, adding the two addition terms of each addition group by using an adder, thereby obtaining addition terms for a next layer, in which a bit number of the adder is equivalent to that of one addition term comprising the maximum bit number in every addition group, and repeating the addition process to obtain an addition result.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 8a~8b are schematic diagrams showing the addition process of the terms (0.148*R) and (0.291*G) for the equation (2) according to an embodiment of the invention;

DETAILED DESCRIPTION

The present invention discloses a method of image format conversion and remote control device using the same.

Embodiments of the invention reduce chip volume and execute additional operations in a cycle period at a predetermined speed, for example, 83.3 MHz. Note that the invention is applicable for a higher speed.

Additionally, an image conversion simultaneous equation described above, including the equations (1) ~(3), are decimally operated. The decimal coefficients of terms are converted to binary positives, for example, decimal coefficients of the equation (1) described in the following.

0.257=0.010000011100=>010000011100, 0.504=0.100000010000=>100000010000, 0.098=0.000110010001=>000110010001.

Each coefficient has a right shift of 12 bits, and a left shift of 12 bits after an addition process is complete, thus obtaining 12-bit (coefficients)×8-bit (pixel values) addition terms.

Figure 1A:
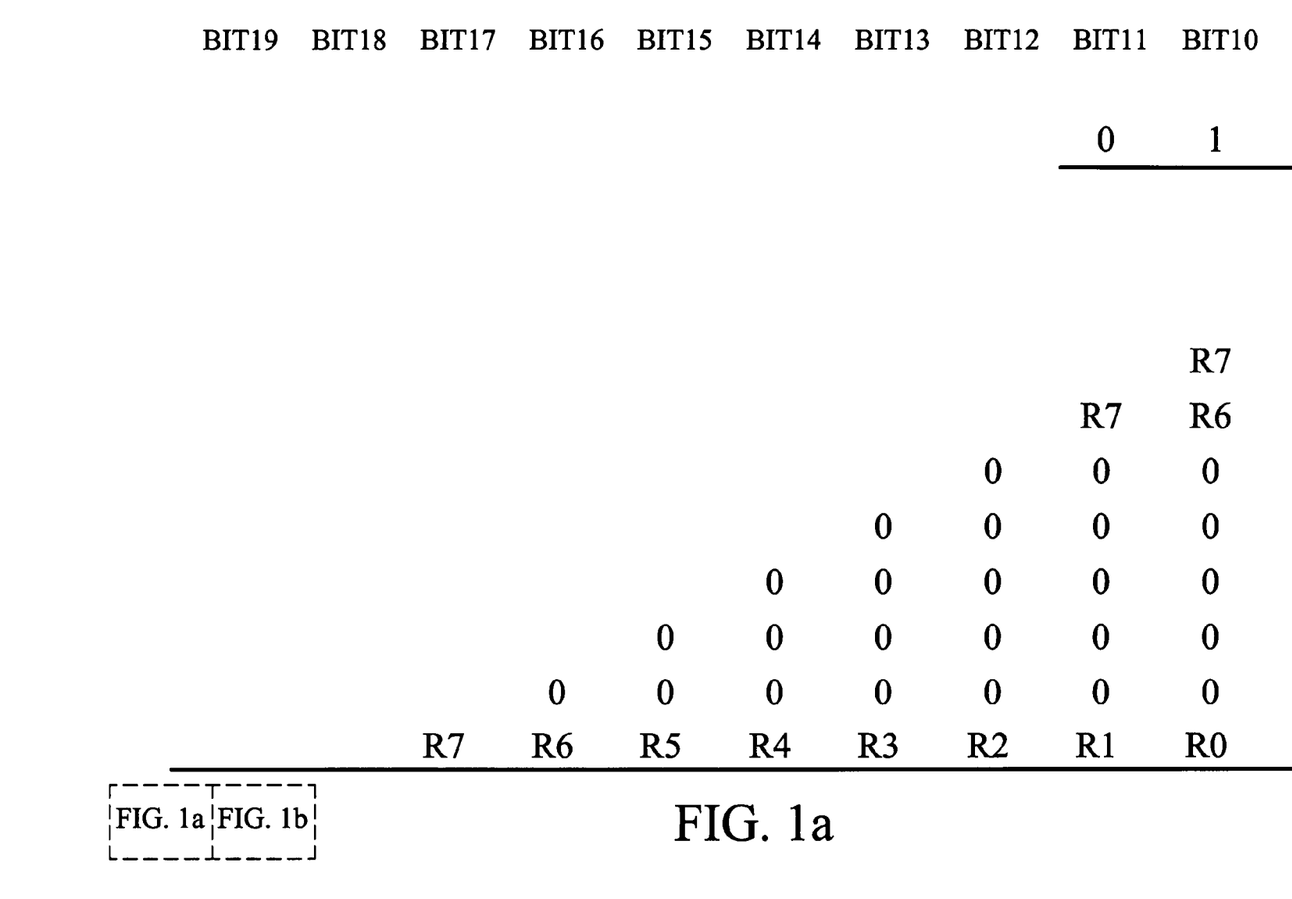
FIGS. 1a and 1b are schematic diagrams showing the addition terms of an embodiment of the invention, in which the addition terms are obtained by expanding an image conversion equation.
Figure 1B:
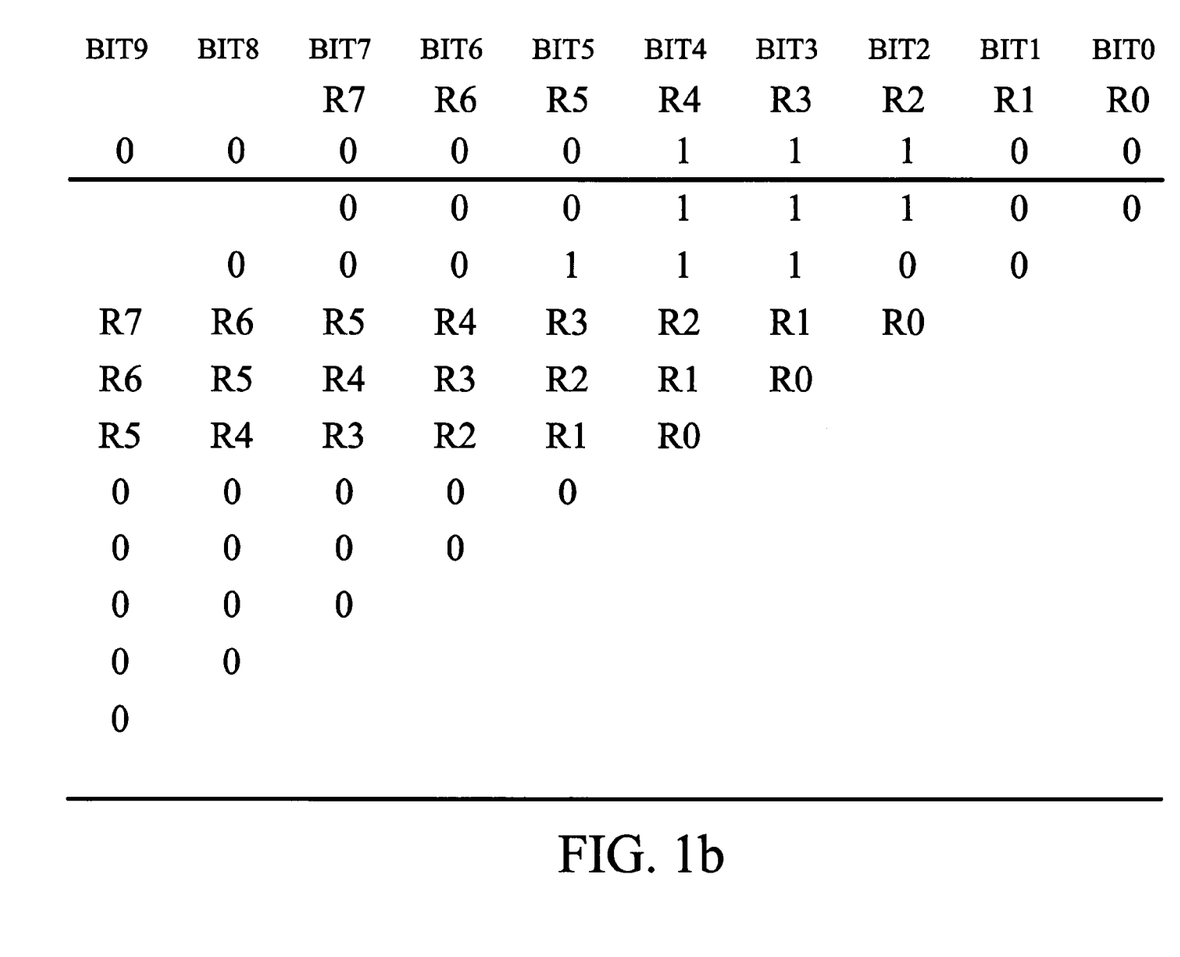
Figure 2:
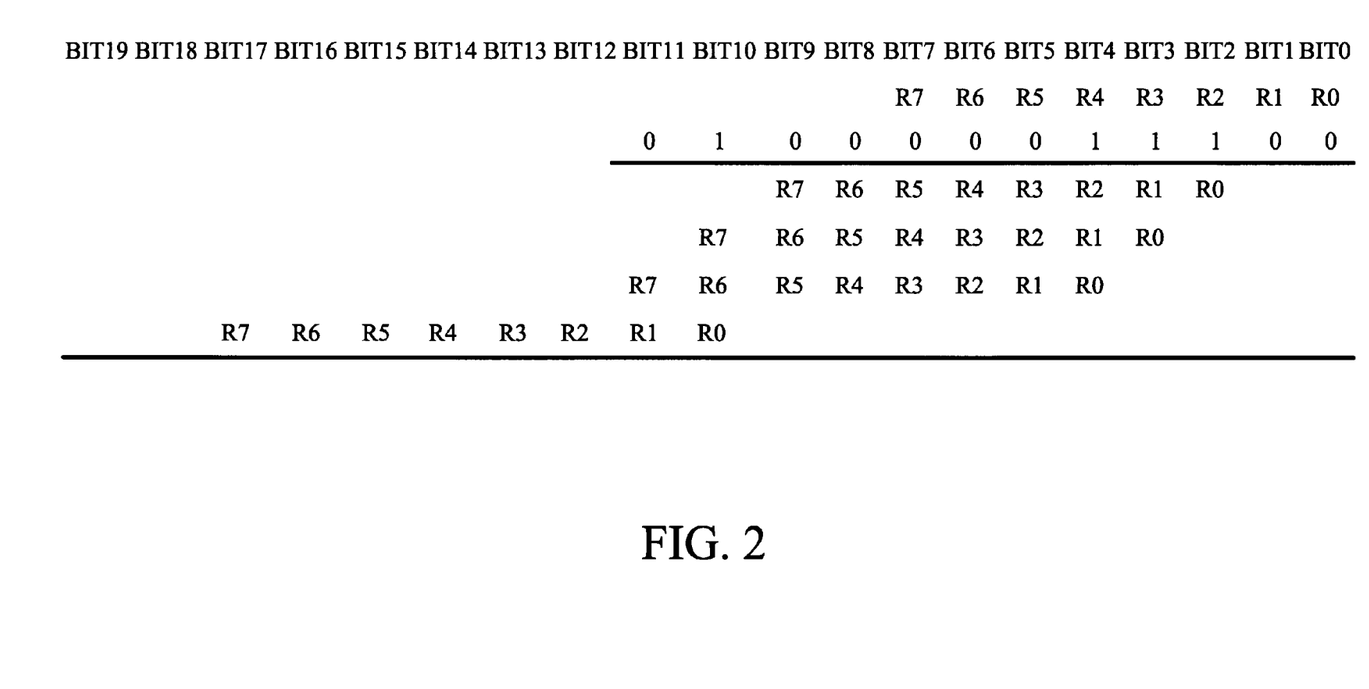
FIG. 2 is a schematic diagram showing a simplification operation of the addition terms shown in FIG. 2 according to an embodiment of the invention.
Figure 3A:
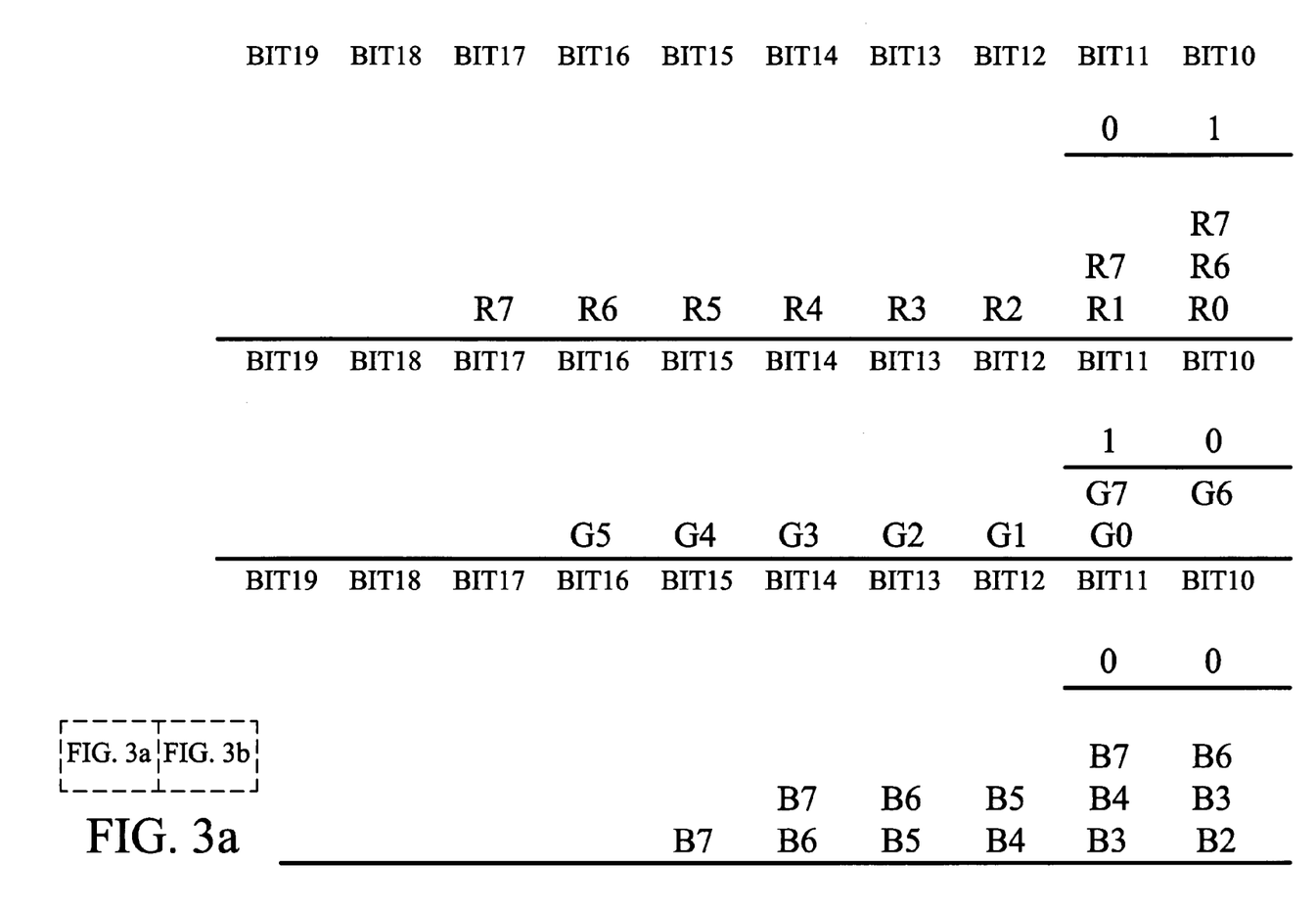
FIGS. 3a and 3b are schematic diagrams showing all addition terms for a first layer of an embodiment of the invention.
Figure 3B:
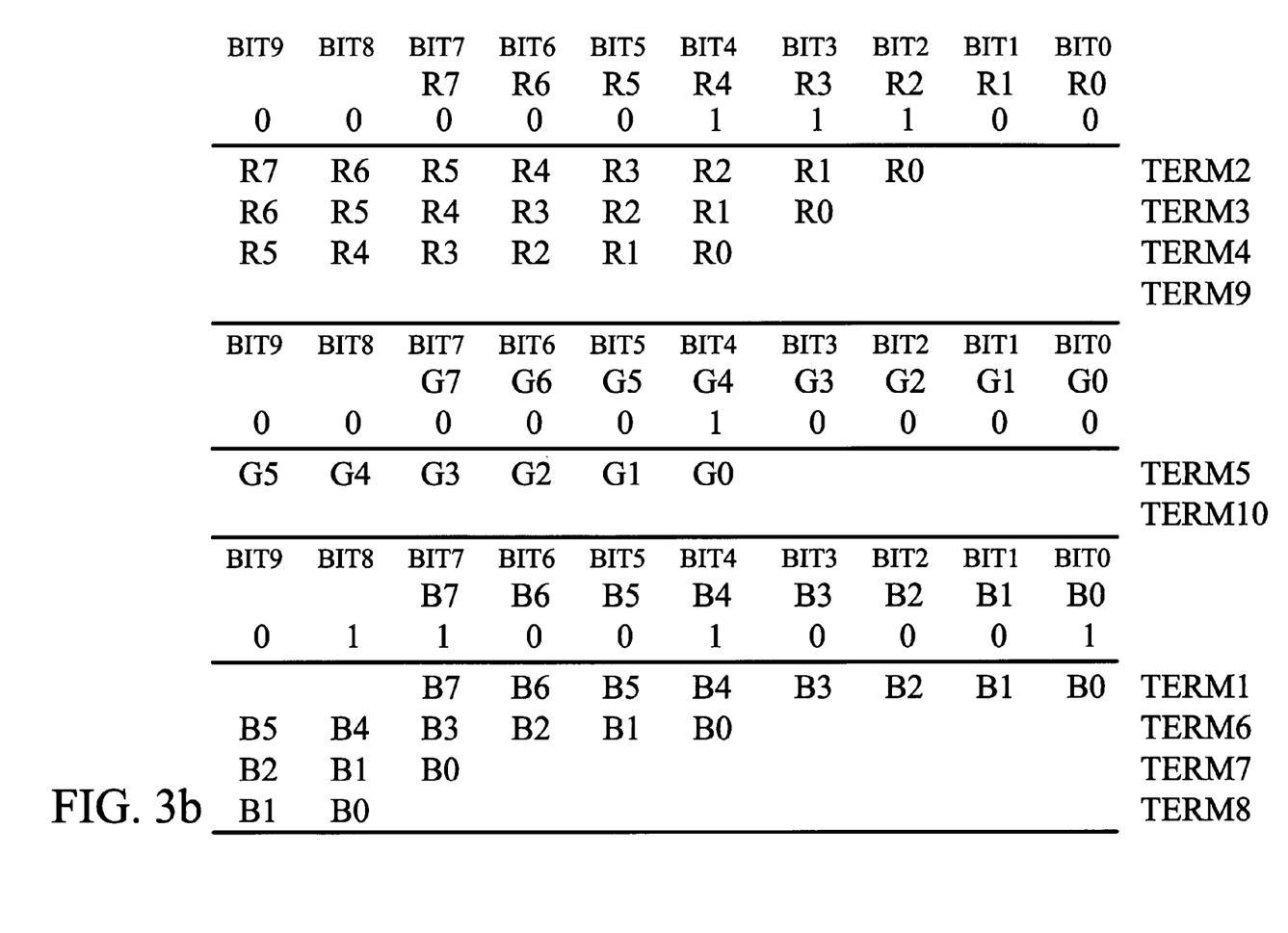

An image conversion table, comprising a plurality of addition terms obtained by expanding the image conversion equation, is created in advance. The addition terms with values of whole bit fields equaling to zero are eliminated. The coefficient 0.257 and multiplier R, for example, of the term (0.257*R) are converted to 010000011100 and R7R6R5R4R3R2R1R0 respectively, and multiplication therebetween is shown in FIGS. 1a and 1b. Next, simplification of the term (0.257*R) is shown in FIG. 2, eliminating all bit values equivalent to zero. Additionally, terms (0.504*G) and (0.098*B) are thus processed, and all addition terms are then numbered, from term1 to term10, as shown in FIGS. 3a and 3b.

Figure 4:
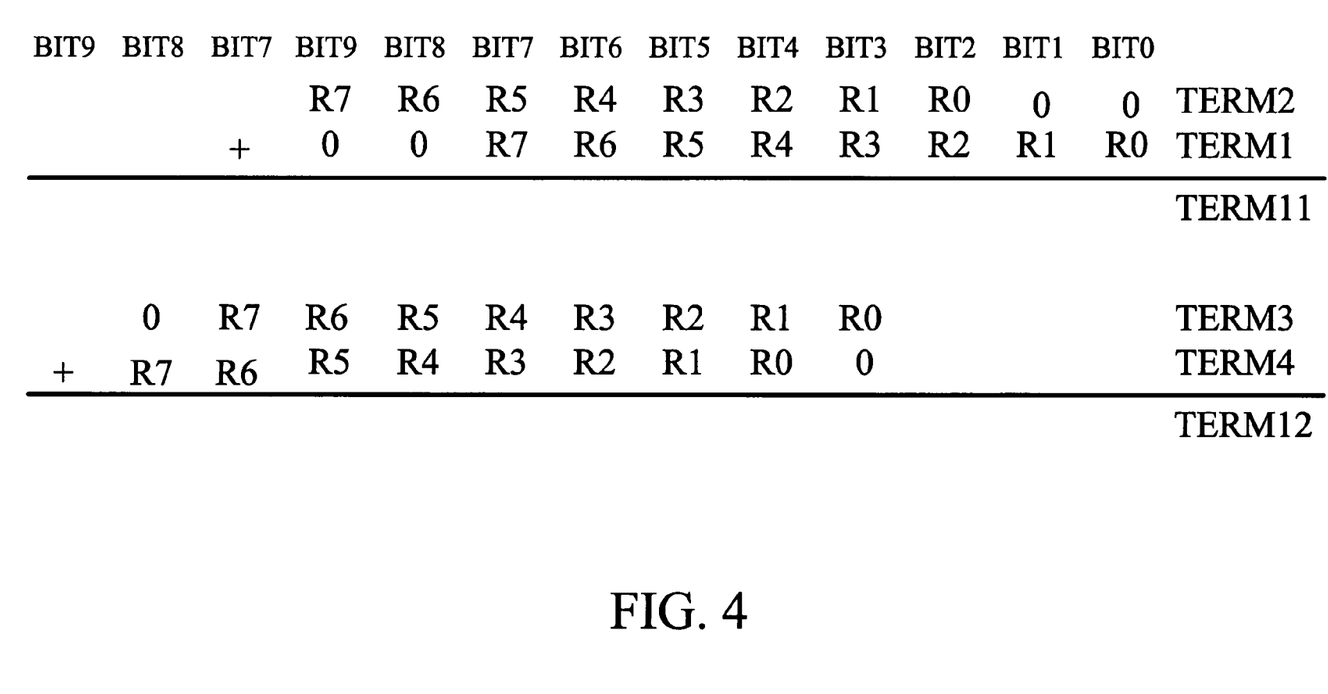
FIG. 4 is a schematic diagram showing every two addition terms assigned to an addition group according to an embodiment of the invention, in which any two addition terms of one addition group have the minimum bit difference therebetween.

The addition process is implemented by adders using a carry-look-ahead method for reduction of operation time. Every two addition terms are assigned to an addition group, in which any two addition terms of one addition group have the minimum bit difference therebetween. As shown in FIGS. 3a and 3b, for example, bit tracking starts at BIT0, detecting one addition term for addition to be defined by TERM1, then detecting another addition term, at BIT2, for addition to be defined by TERM2. TERM1 and TERM2 have the minimum bit difference therebetween and assigned to an addition group, added using a 10-bit adder. TERM3 and TERM4 are thus obtained, as shown in FIG. 4, and so forth. TERM1 to TERM10 are addition terms for a first layer.

The addition terms for the first layer are hierarchically added to obtain addition terms for a next layer, in which the bit number of a used adder are equivalent to the maximum bit in any two addition terms in every addition group. Bits of TERM1 and TERM2, for example, are aligned and bit fields without bit values are filled with zero. Values of BIT0 and BIT1 of TERM2 are zero without carrying a number so the addition result in BIT0 and BIT1 are filled with R0 and R1, thus obtaining TERM11 using a 8-bit adder instead of a 10-bit adder, and using a carry-look-ahead method for reduction of operation time. TERM12 is thus obtained by using an 8-bit adder.

Figure 5:
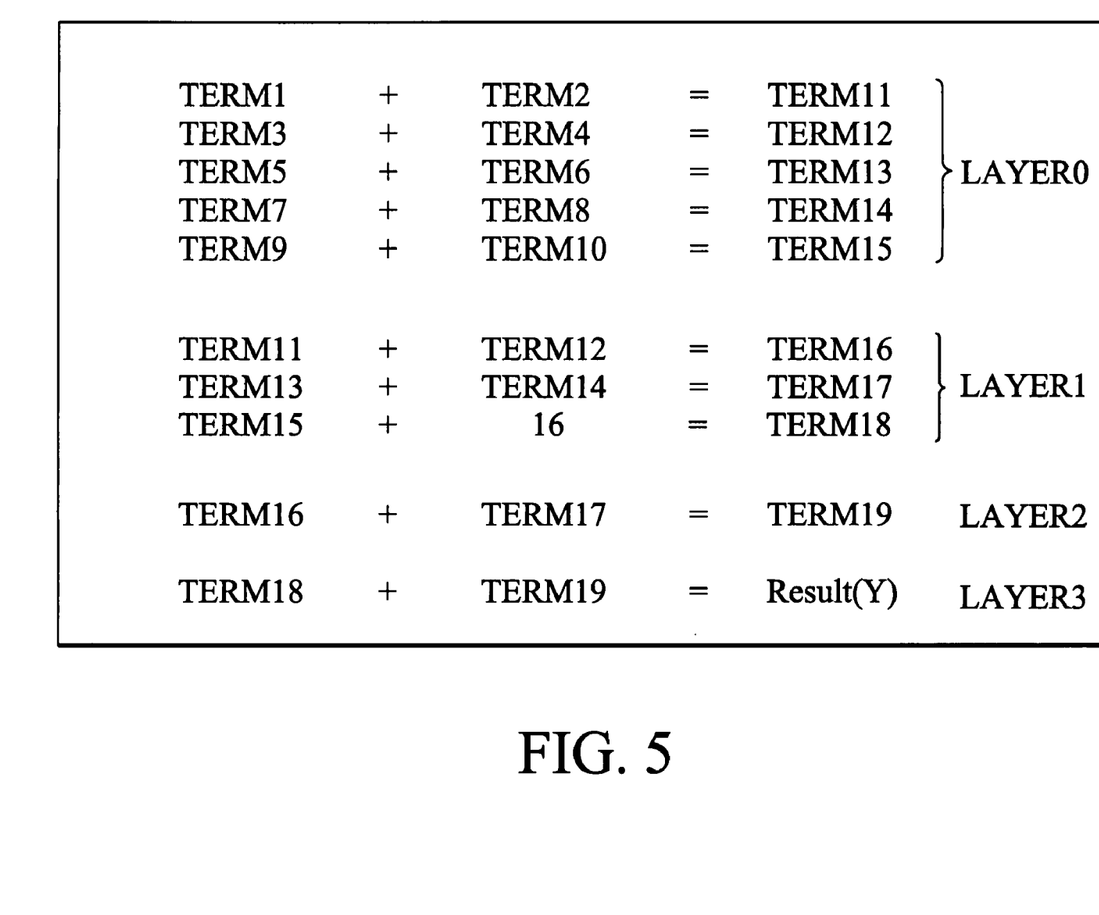
FIG. 5 is a schematic diagram showing the hierarchical layers of the addition terms of an embodiment of the invention.
Figure 6:
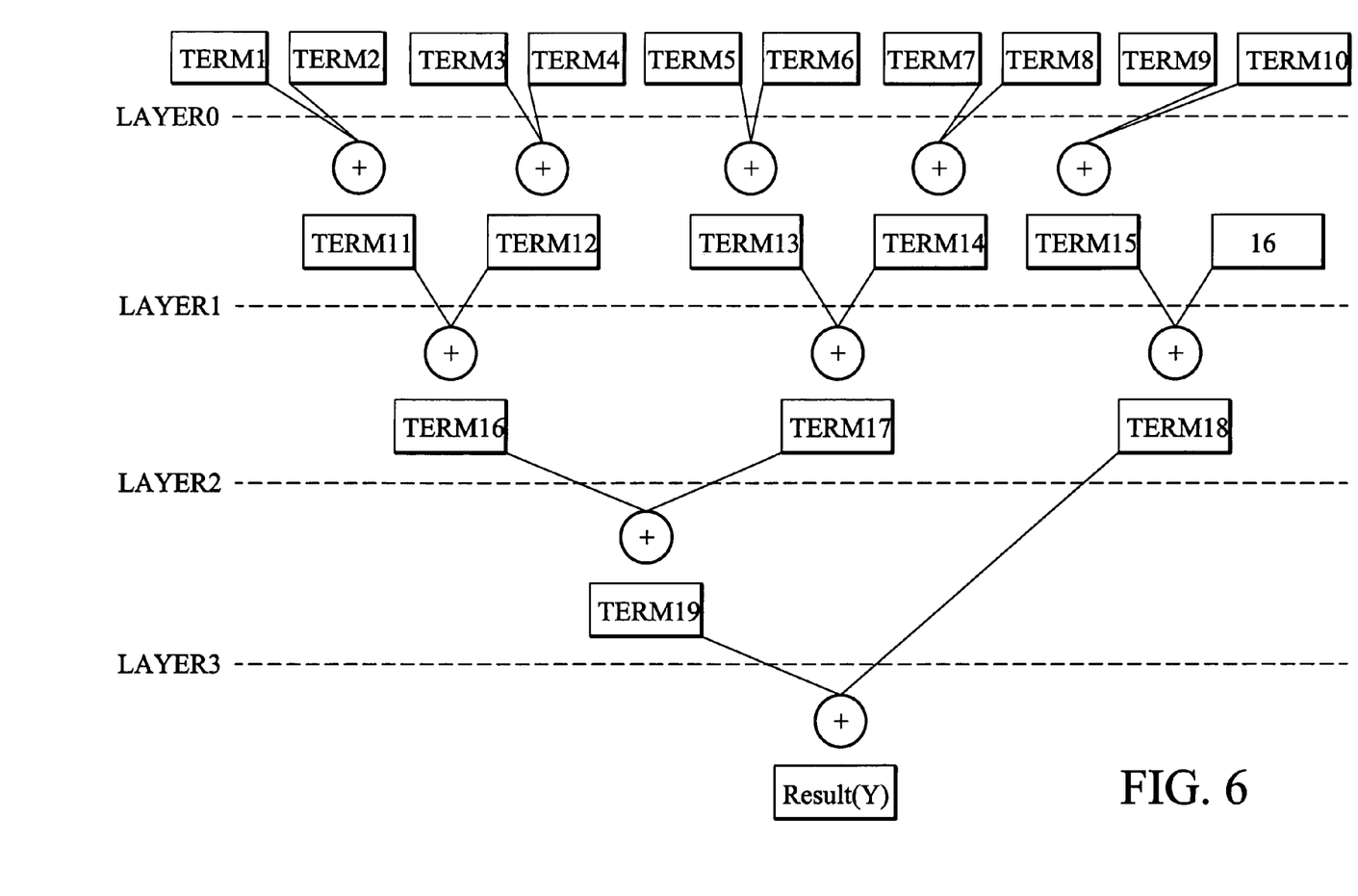
FIG. 6 is a schematic diagram showing the hierarchical structure of the addition terms of an embodiment of the invention.

FIG. 5 is a schematic diagram showing the hierarchical layers of the addition terms of an embodiment of the invention. First, every two terms of TERM1 to TERM10 for the first layer (LAYER0) are added respectively, obtaining TERM 11 to TERM 15 for a second layer (LAYER1). Next, every two terms of TERM11 to TERM15 and a constant 16 are added respectively, obtaining TERM16 to TERM 18 for a third layer (LAYER2). TERM16 and TERM17 are added, obtaining TERM19 for a fourth layer (LAYER3), and finally TERM18 and TERM19 are added, obtaining the addition result for the equation (1). A hierarchical structure for the equation (1) is shown in FIG. 6.

FIGS. 7a~9b are schematic diagrams showing the addition process for the equation (2) of an embodiment of the invention. Equations (2) and (3) comprise subtraction operations so they are processed by two's complement, without using subtraction operators for saving time and chip volume.

The equation (2) can be rewritten as:

$$Cb=[(0.439*B)+128]-[(0.148*R)+(0.291*G)] \quad (4).$$

Similarly, coefficients of the equation can be converted to binary positives, described in the following.

$$0.148=0.001001011110 \Rightarrow 001001011110,$$

$$0.291=0.010010100111 \Rightarrow 010010100111,$$

$$0.439=0.011100000110 \Rightarrow 011100000110.$$

Figure 7A:
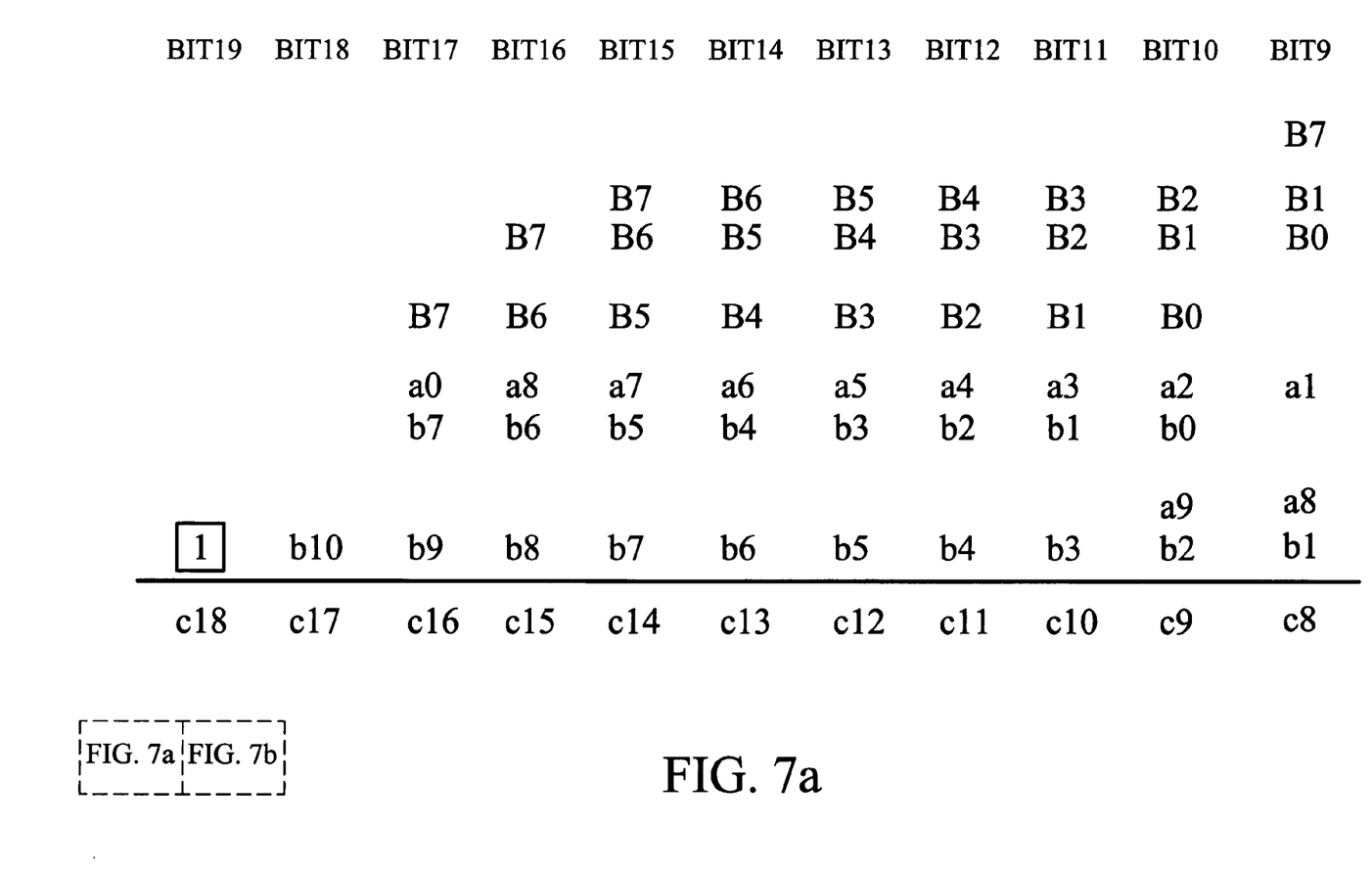
FIGS. 7a~7b are schematic diagrams showing the addition process of the term (0.439*B) for the equation (2) according to an embodiment of the invention.
Figure 7B:
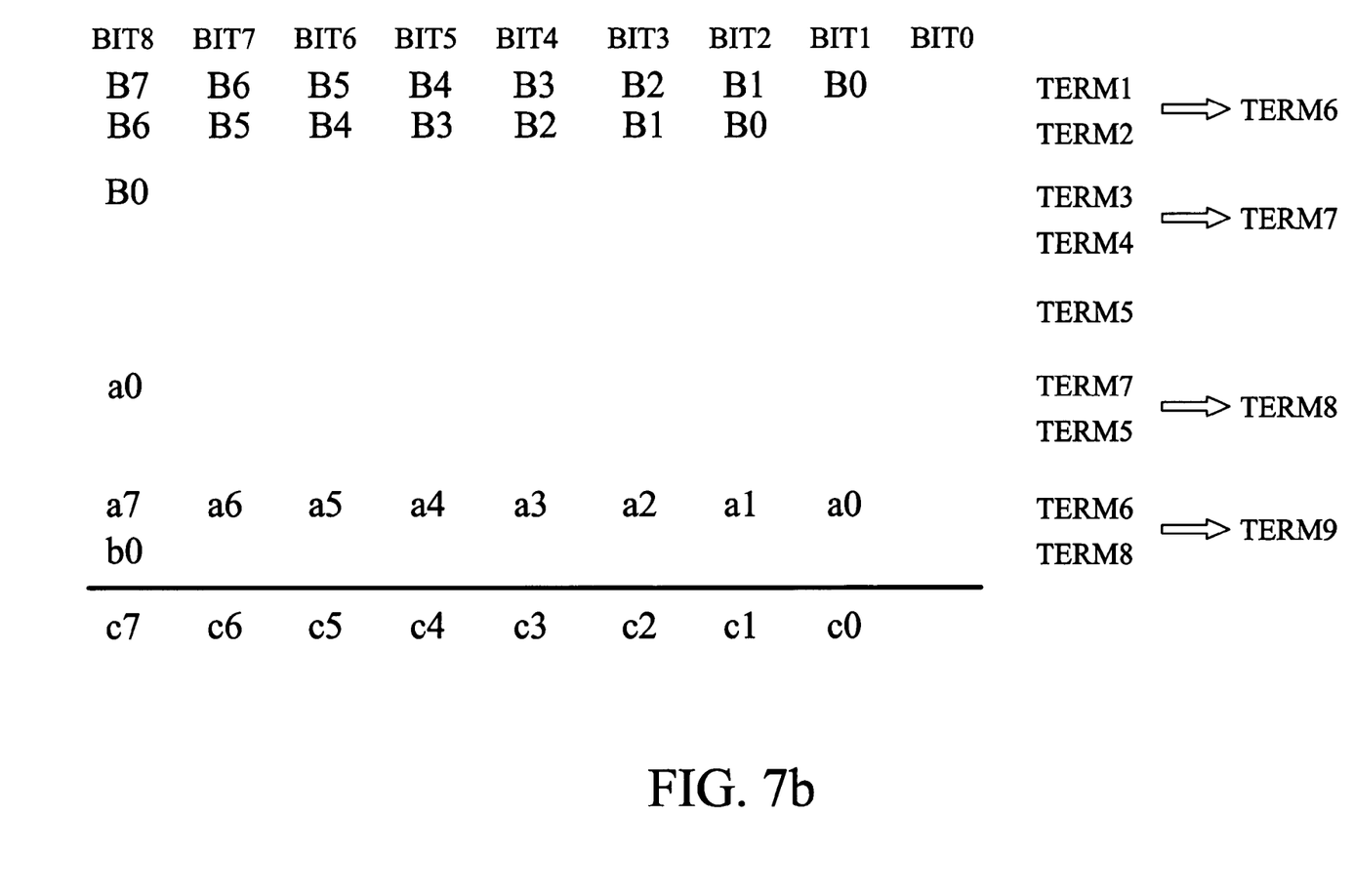
Figure 8B:
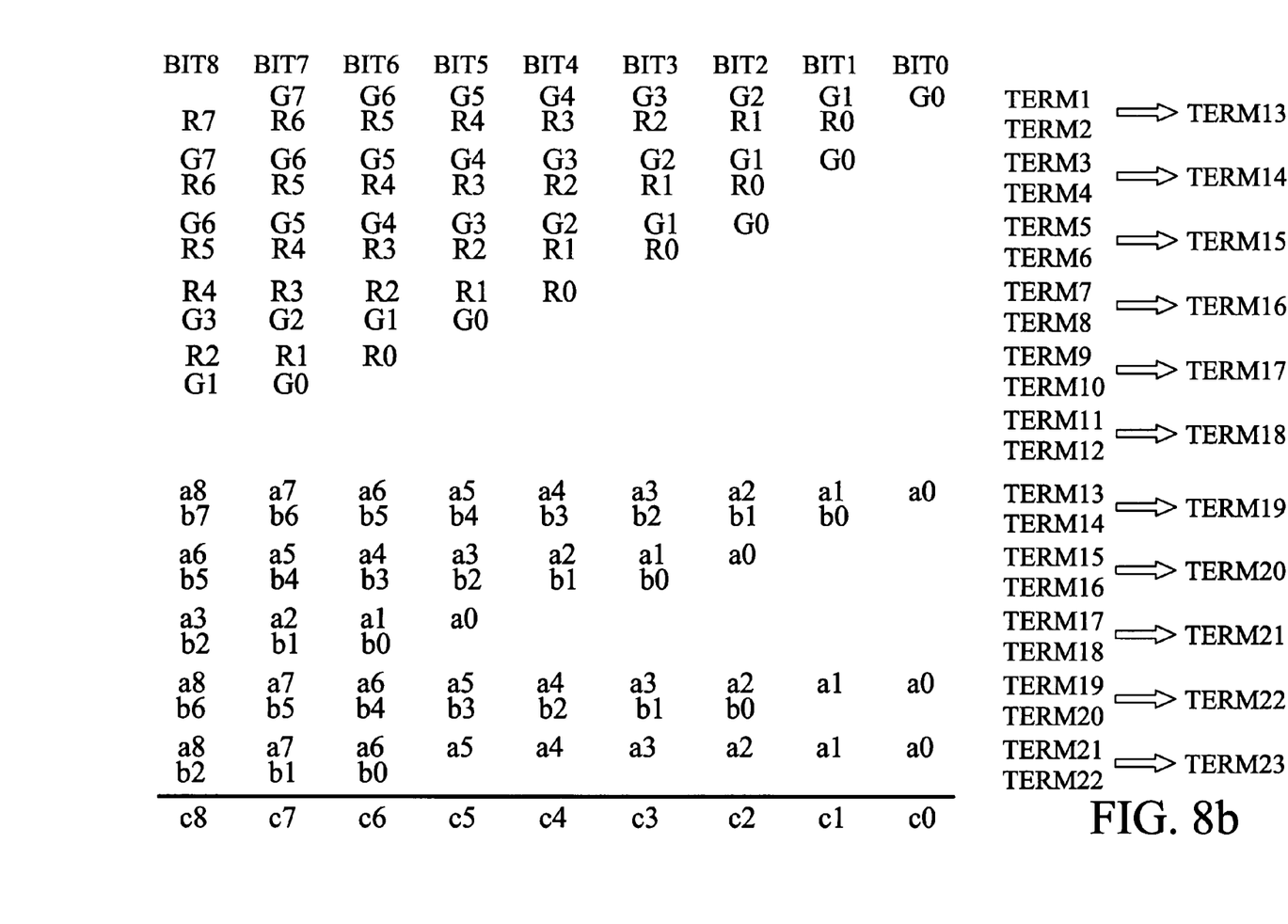

In the addition process, addition operations in both square brackets are processed respectively. Both terms [(0.439*B)+128] and [(0.148*R)+(0.291*G)] are processed as the addition process for the equation (1), as shown in FIGS. 7a and 7b and FIGS. 8a and 8b respectively. The marked constant 1 shown in FIG. 7a is binary representation of the constant 128 for the equation (2), filled at BIT19 while TERM6 and TERM8 are added, thus obtaining the final result of TERM9, as shown in FIG. 7b. Similarly, the finally result of TERM23 for the term [(0.148*R)+(0.291*G)] is obtained accordingly, as shown in FIGS. 8a and 8b.

Figure 9A:
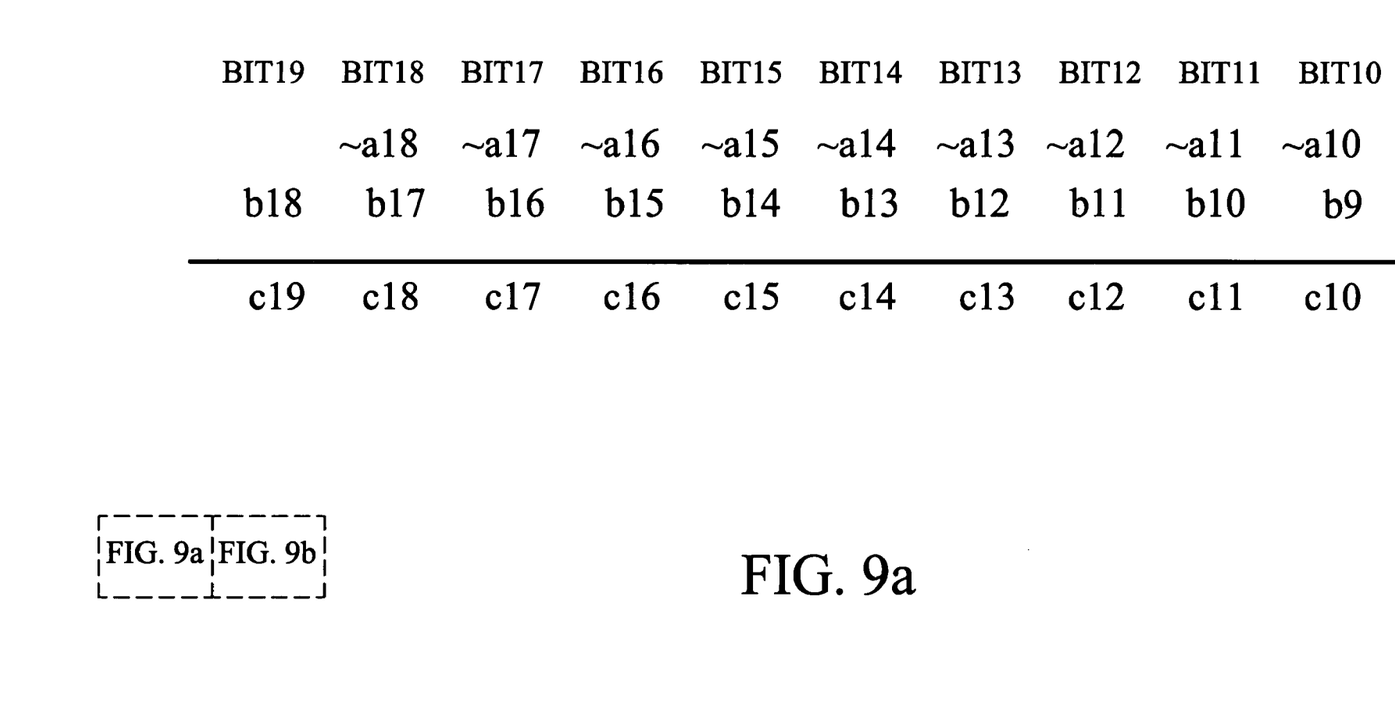
FIGS. 9a~9b are schematic diagrams showing the addition result for the equation (2) of an embodiment of the invention.
Figure 9B:
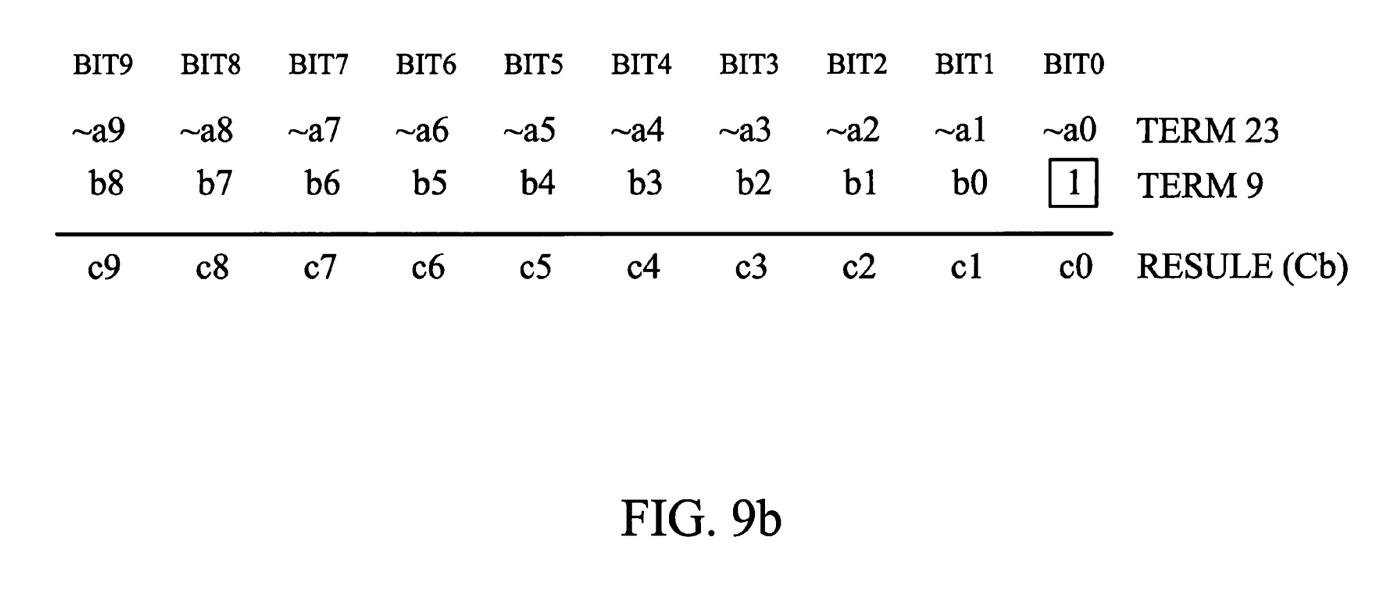

After that, the addition result for the equation (2) is obtained by two's complement because of subtraction operation, represented as TERM9−TERM23=TERM9+(−TERM23), as shown in FIGS. 9a and 9b. Bit values of TERM23 are inversed respectively, 1 to 0 or 0 to 1, and constant 1 is added at the last bit field, BIT0, thus obtaining the addition result of Cb for the equation (2).

The addition operation for the equation (3) is processed as well as equations (1) and (2), thus obtaining a 20-bit value for Y, Cb, and Cr respectively, in which BIT0 to BIT 11 belong to integer part and BIT 12 to BIT 19 belong to decimal part. Additionally, addition results for Y, Cb, and Cr are obtained by converting binary results thereof to decimal positives.

Figure 10:
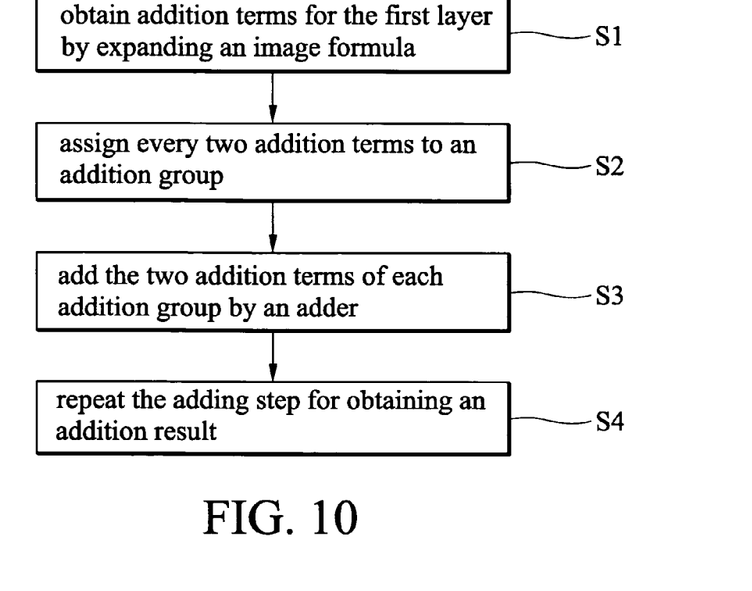
FIG. 10 is a flowchart showing the method of image format conversion of an embodiment of the invention.

FIG. 10 is a flowchart showing the method of image format conversion of an embodiment of the invention. Addition terms for a first layer are obtained by expanding an image conversion equation (Step S1), stored in an image conversion table. Every two addition terms are assigned to an addition group, in which any two addition terms of one addition group have the minimum bit difference therebetween (Step S2). Next, the two addition terms of each addition group are added by an adder using a carry-look-ahead method, obtaining addition terms for a next layer, in which the bit number of the adder are equivalent to the maximum bit in any two addition terms in every addition group (Step S3). Finally, Step S3 is repeated to obtain the addition result of the addition process (Step S4).

Figure 11:
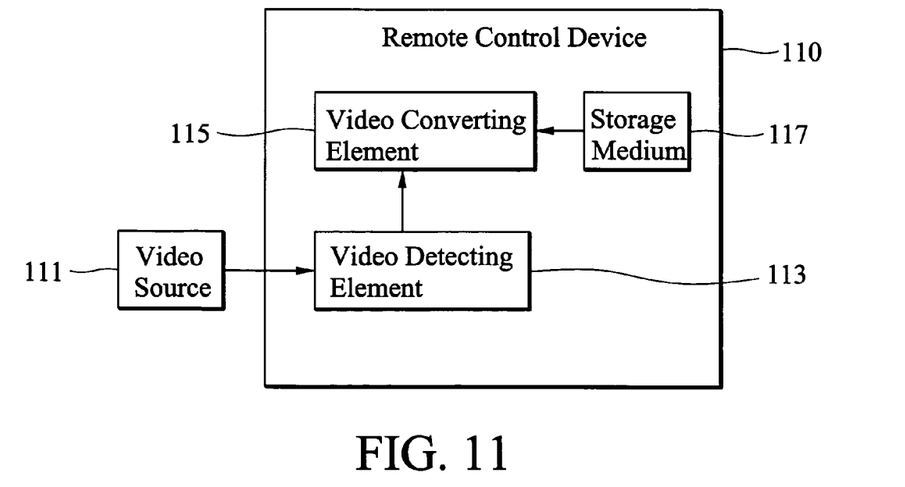
FIG. 11 is a schematic diagram showing the architecture of the remote control device of an embodiment the invention.

FIG. 11 is a schematic diagram showing the architecture of the remote control device of an embodiment the invention. The remote control device 110 comprises a storage medium 117 storing an image conversion table, a video detecting element 113 detecting and receiving video images, and a video converting element 115. The image conversion table comprises a plurality of addition terms for a first layer obtained by expanding an image conversion equation.

Video detecting element 113 detects image signals from a video source 111 and transfers the signals to video converting element 115. Video converting element 115 derives the addition terms for the first layer from the image conversion table, assigns every two addition terms to an addition group, adds the two addition terms of each addition group by an adder using a carry-look-ahead method, obtains addition terms for a next layer, and repeats the process for an addition result.

Embodiments of the invention use adders for image conversion devices instead of multiplexers, providing optimized processing in accordance with coefficients of an image conversion equation, improving operation speed and data transmission.

While embodiments of the invention have been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A remote control device capable of converting image format, comprising:

a storage medium, storing an image conversion table comprising a plurality of addition terms obtained by expanding an image conversion equation;

a video detecting unit, receiving and detecting video images; and a video converting unit, coupled to both the storage medium and the video detecting element, obtaining the addition terms for a first layer from the image conversion table, allocating every two addition terms to an addition group, adding the two addition terms of each addition group by using an adder, thereby obtaining addition terms for a next layer, wherein a bit number of the adder is equivalent to that of one addition term comprising the maximum bit number in every addition group, and repeating the addition process for obtaining an addition result.

2. The device as claimed in claim 1, wherein the addition terms are binary ones, and the addition terms whose values of whole bit fields are equal to zero are eliminated.

3. The device as claimed in claim 1, wherein the two addition terms of any addition group have the minimum bit difference therebetween.

4. The device as claimed in claim 1, wherein the image conversion equation is used to convert a RGB image format into a YCbCr image format.

5. The device as claimed in claim 1, wherein the addition of the two addition terms is implemented by using a Carry-Look-Ahead algorithm.

6. The device as claimed in claim 1, wherein subtraction of the two addition terms is implemented by addition of the two's complement.

* * * * *